US009068298B2

(12) United States Patent
Everett et al.

(10) Patent No.: US 9,068,298 B2
(45) Date of Patent: Jun. 30, 2015

(54) VARIABLE WIDTH MATERIAL DISTRIBUTION APPARATUS

(75) Inventors: Benjamin John Everett, St. Johns (NZ); Thomas A. Roth, Lerna, IL (US)

(73) Assignee: THE BENJAMIN EVERETT FAMILY TRUST, Auckland (NZ)

( * ) Notice: Subject to any disclaimer, the term of this patent is extended or adjusted under 35 U.S.C. 154(b) by 0 days.

(21) Appl. No.: 13/336,128

(22) Filed: Dec. 23, 2011

(65) Prior Publication Data

US 2012/0163913 A1 Jun. 28, 2012

Related U.S. Application Data

(60) Provisional application No. 61/427,125, filed on Dec. 24, 2010.

(51) Int. Cl.
*E01C 19/18* (2006.01)
*B65G 69/04* (2006.01)

(52) U.S. Cl.
CPC .......... *E01C 19/182* (2013.01); *B65G 69/0433* (2013.01); *E01C 19/187* (2013.01)

(58) Field of Classification Search
USPC .......................................... 404/101; 198/660
See application file for complete search history.

(56) References Cited

U.S. PATENT DOCUMENTS

| | | | | |
|---|---|---|---|---|
| 2,845,167 A | * | 7/1958 | Heiken | 198/660 |
| 3,015,258 A | * | 1/1962 | Apel et al. | 404/106 |
| 3,605,995 A | * | 9/1971 | Maack | 198/660 |
| 4,356,910 A | * | 11/1982 | Togstad | 198/660 |
| 4,749,304 A | | 6/1988 | Craig | |
| 4,772,156 A | | 9/1988 | Craig | |
| 5,099,984 A | * | 3/1992 | Kuzub | 198/518 |
| 5,099,986 A | * | 3/1992 | Kuzub | 198/666 |
| 5,531,542 A | * | 7/1996 | Willis | 404/101 |
| 5,980,153 A | * | 11/1999 | Plemons et al. | 404/72 |

FOREIGN PATENT DOCUMENTS

DE 19707682 A1 9/1998

* cited by examiner

*Primary Examiner* — Matthew D Troutman
(74) *Attorney, Agent, or Firm* — King & Schickli, PLLC

(57) ABSTRACT

A variable width distribution apparatus (1) for distributing asphalt hot-mix, or similar material, across the full width of a surface to be paved comprises at least two auger support members (9), each auger support member positioned coaxially with each other and configured to engage with an adjacent auger support member (9) to form a combined support of variable length; and at least two auger slide sections (3) comprising an outboard auger slide section (3B) coupled to an outboard auger support section at an outboard end via a hanger, each auger slide section positioned coaxially with each other and configured to engage with an adjacent auger slide section to form a combined auger of variable length; such that extension or retraction of the auger support members (9) along a path of least resistance as the apparatus (1) moves over a surface to be paved causes a corresponding extension or retraction of the auger slide sections (3) with respect to an adjacent auger slide section (3) and such that each auger slide section (3) is configured to maintain a continuous worm with respect to an adjacent auger slide section (3) when in an extended position in relation to one another.

20 Claims, 6 Drawing Sheets

VARIABLE WIDTH MATERIAL DISTRIBUTION APPARATUS

STATEMENT OF CORRESPONDING APPLICATIONS

This utility patent application claims the benefit of U.S. Patent Application No. 61/427,125, filed Dec. 24, 2010, the entire contents of which are incorporated herein.

TECHNICAL FIELD

The present invention relates generally to a variable width material distribution apparatus. In particular, a variable width material distribution apparatus for use in a paving machine to distribute hot asphalt mix during laying of a road surface.

BACKGROUND AND OBJECTS OF THE INVENTION

The use of a mobile paving machine to deposit and distribute a surfacing material such as hot asphalt mix over a surface is known. These paving machines ('pavers') use a material distribution apparatus in the form of auger flights or paddles mounted on rotatable shafts to distribute the hot asphalt mix across a width of the surface. Traditionally the width of the auger is manually altered to accommodate different widths of surface by addition or removal of bolt-on auger sections to create wider or narrower widths.

It is a well known and generally recognised industry fact that in order to have a long lasting, consistent and homogenous asphalt surface that there must be an even and consistent "head of material" across the full width of the paving machine screed at all times. Failure to do this will lead to segregation of hot asphalt mix, an uneven finished surface and inconsistent density of the asphalt leading to reduced pavement life. Without extensions to the auger's there is a need to manually hand shovel out the hot asphalt mix to the end gates. Not only is this a hard, physically demanding task, it also causes the paving thickness/density to be compromised in this area by not having the same consistent forces acting on the screed as you would with auger guards and extensions fitted.

A fundamental and important aspect in achieving an even and consistent head of material over the entire width of the paver screed is to use auger guards and auger extensions to distribute the material generally to within 17-18" of the respective right and left end gates. The problem frequently occurs that many roads to be paved are of varying width and require frequent paving width adjustments on the go. The paving machine must be stopped and bolt on augers and mainframe extensions added or removed as required which takes a lot of time and is not efficient or practical. It would normally take at least 15-20 minutes per side to remove or fit short auger extensions that don't require an outer support bearing. Such stops or delays also result in settling of the pavers screed on to the fresh asphalt surface being paved, causing a bump or dip in the surface.

A further disadvantage associated with manual auger extensions is that most asphalt paving crews will generally default to determining the minimum paving width required and only put on enough auger and mainframe extensions to cope with this. This in turn compromise's the head of material each time they have to extend to a wide width, resulting in an inconsistent and poor finish to the paved surface.

A smaller head of material than required reduces the forces acting against the screed which will cause the screed to drop and pave thinner than desired. Conversely the opposite is also true-by not confining the material with the correct auger extensions and guards, it is necessary to "overload" the material in an attempt to force the paving material out to the screed end gates when there is a wide width to be paved. This causes more resistance and therefore the screed will tend to rise and lay thicker than the required paving depth.

In addition, attempting to pave wide without the necessary auger extensions and guards fitted can often result in the paver getting stuck and loosing traction as a result of having a massively overloaded head of material between the tractor and the screed because there is no confinement or "tunnel" created. Effectively the paving machine is trying to drag far more material than is needed to pave but it has no choice but to try and pull this excess material in order to get enough mix out to the ends of the screed. This is a known and common problem that reduces the quality of the finished paved surface. Many people seem to accept it as being inevitable.

Furthermore, if one "confines" the head of material by using the appropriate auger extensions and guards, there will be a significantly reduced pile of material at the end of each paving run which is required to be picked up versus paving the same width run without the necessary auger extensions and guards. This saves time and effort by the crew who only need to shovel up the minimum amount of excess asphalt mix necessary.

The use of a variable width material distribution apparatus to accommodate different widths of surface, while making a pass of the paving machine over the surface, has gone some way to solving the above disadvantages. U.S. Pat. No. 4,749,304 discloses a variable width distribution apparatus comprising telescoping distribution tubes which fit over one another and connect to one another via tongue and groove interconnections to form a continuous auger worm in a retracted position and a half-worm in an extended position. U.S. Pat. No. 4,772,156 discloses this aspect more fully and improves maintenance of the auger by including a bolt-on means for replacing the individual flight elements of the distribution tubes.

The disadvantage of this arrangement is impaired efficiency of distribution of the road surfacing material in extended positions in comparison to retracted positions. In addition, while replacement of individual flight elements goes some way towards improving maintenance of the material distribution apparatus, damage to the distribution tubes themselves would still require relatively costly repair with the result that the paving machine would be out of action for a significant period.

As the hot asphalt mixture is hot, sticky and hardens when cooled, the material distribution apparatus must also be robust and able to operate over extended periods.

It is an object of the present invention to provide an improved variable width material distribution apparatus or at least to provide the public with a useful choice.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein; this reference does not constitute an admission that any of these documents forms part of the common general knowledge in the art, in New Zealand or in any other country It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

SUMMARY OF THE INVENTION

According to one aspect of the present invention there is provided a variable width material distribution apparatus for use with a paving machine, comprising:

- at least two auger support member, each auger support member positioned coaxially with each other and configured to engage with an adjacent auger support member to form a combined support of variable length; and
- at least two auger slide sections comprising an outboard auger slide section coupled to an outboard auger support section at an outboard end via a hanger, each auger slide section positioned coaxially with each other and configured to engage with an adjacent auger slide section to form a combined auger of variable length wherein extension or retraction of the auger support members along a path of least resistance as the paving machine moves over a surface to be paved causes a corresponding extension or retraction of the auger slide sections with respect to an adjacent auger slide section and wherein each auger slide section is configured to maintain a continuous worm with respect to an adjacent auger slide section when in an extended position in relation to one another.

In this way, a consistent pressure to a screed and head of material is maintained at all times resulting in a paved surface of relatively constant thickness/density and texture.

For the purposes of this specification, the term 'extended position' means any position of extension from a retracted position through an intermediate extended position to a fully extended position.

Preferably, the number of auger support members consists of an inboard auger support member, an intermediate auger support member and an outboard auger support member, wherein the intermediate auger support member is connected to the inboard auger support member at an inboard end and to the outboard auger support member at an outboard end.

Preferably, each auger support member is configured to extend telescopically from an adjacent auger support member.

Preferably, the number of auger slide sections is between 3 and 10.

Preferably, each auger slide section is engaged with an adjacent like auger slide section by at least one guide rod.

Preferably, each auger slide section comprises at least one tapered surface which is configured to remove asphalt mix which has stuck between adjacent auger slide sections.

More preferably, the at least one tapered surface is positioned at an angle of 15.6° and is configured to push asphalt mix positioned between adjacent auger slide sections away from same.

In this way the auger slide sections self-clean on movement between an extended position and a retracted position to reduce the occurrence of asphalt mix jamming between the auger slide sections and preventing full retraction of same.

Preferably, the working surfaces of each auger slide section in contact with asphalt mix during use of the paving machine are chromed.

In this way the occurrence of cooled asphalt mix sticking to the working surfaces of each auger slide section is reduced.

Preferably, each auger slide section is configured to be removably attachable with respect to an adjacent auger slide section.

Preferably, an inboard side of an inboard auger slide section is connected to a body of the material distribution apparatus at a first bearing configured to provide for rotation of the auger slide sections in unison in an extended or retracted position.

More preferably, the outboard end of the outboard auger slide section is connected to the hanger at a second bearing configured to provide for rotation of the auger slide sections in unison in an extended or retracted position.

Preferably, the variable width material distribution apparatus also comprises an auger drive box comprising a motor configured to provide rotation to an auger drive shaft to in turn provide rotation to the auger slide sections.

More preferably, the auger drive box is located on an outboard end of the auger drive shaft.

In this way, 'centre line segregation' of asphalt mix on a paved surface by a centrally positioned auger drive box preventing the asphalt mix from moving freely during distribution by the variable width material distribution is prevented.

BRIEF DESCRIPTION OF THE FIGURES

Preferred embodiments of the present invention will now be described by way of example only and with reference to the accompanying Figures in which.

DETAILED DESCRIPTION OF A PREFERRED EMBODIMENT OF THE INVENTION

Figure 4:
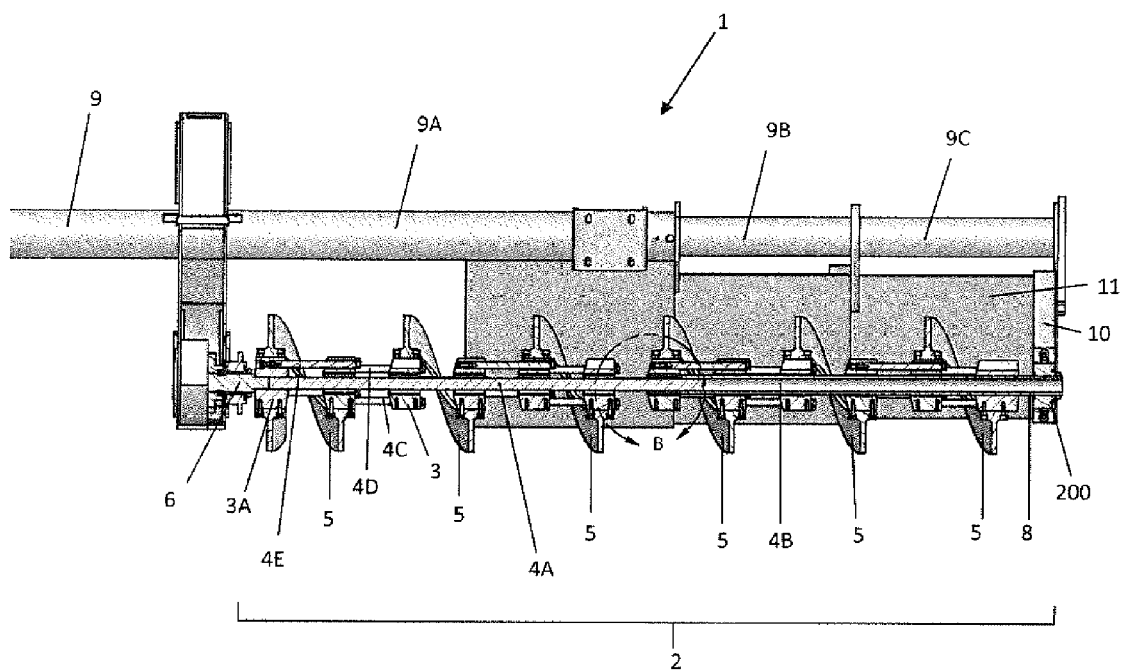
FIG. 4 shows a sectional view of the preferred embodiment shown in FIG. 1 in the extended position.
Figure 5:
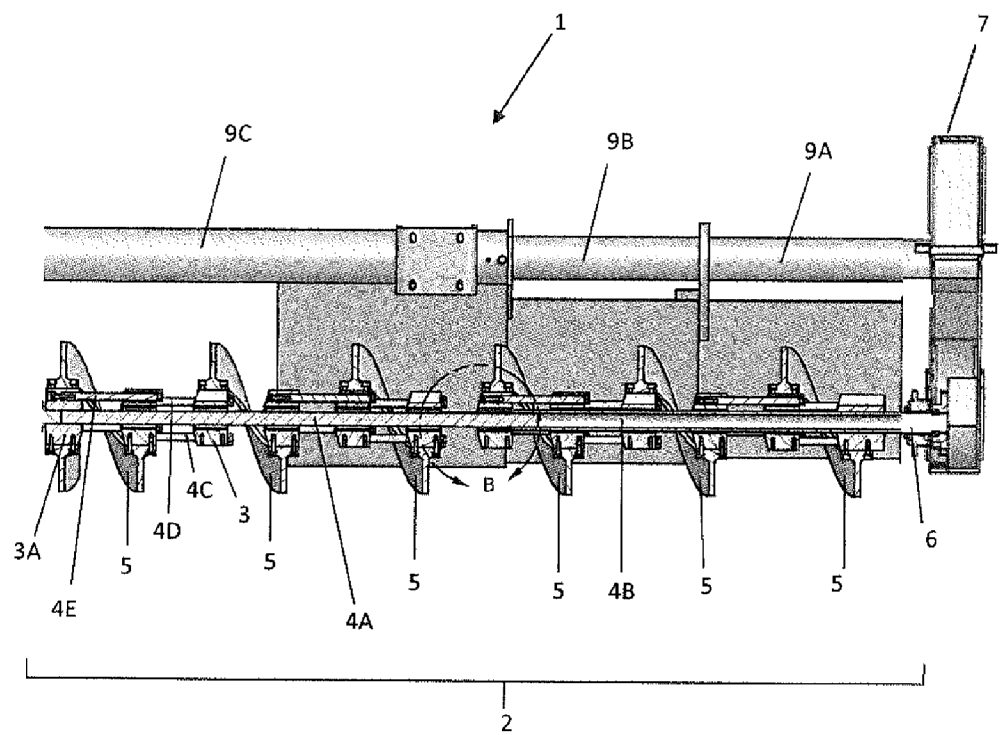
FIG. 5 shows a partial sectional view of an alternate embodiment of the invention with the central drive box located at an outboard position with respect to the outboard auger slide section 3B.

A preferred embodiment of the present invention in the form of a material distribution apparatus for a paving machine (not shown) is generally indicated by arrow 1. An auger 2 comprising five auger slide sections 3 positioned coaxially with each other and which run on sliding linkages in the form of central auger slide shaft 4A and outer tube 4B (as shown in FIG. 4) and a series of auger guide rods 4C, 4D and 4E (shown in FIG. 4). The auger guide rods 4C-E connect with the auger slide sections 3 at grooves 3A which are configured with stops (not shown) which prevent overextension of the auger guide rods 4C-E within the grooves 3A (shown in FIG. 4).

Movement of the auger slide sections 3 relative to an adjacent auger slide section 3 to form a combined auger 2 of variable length. The auger slide sections 3 comprise a half auger flighting 5 fixed to the auger slide sections 3 by four 12 mm bolts (not shown).

The central auger slide shaft 4A and tube 4B functions to support the auger slide sections 3 and flighting 5 while the auger 2 is being extended. The auger slide sections 3 have bushings (not shown) in the grooves 3A to facilitate movement of the auger guide rods 4C-E. The central auger slide tube 4B has an internal bushing (not shown) to enable movement of the central auger slide shaft 4A within the tube 4B. The preferred bushings used in the auger slide sections 3 and the central auger slide tubes 4B are Sealmaster ball bearing bushings. The auger slide sections 3 and the central auger slide tubes 4B are configured to shield the bushings from contact with asphalt mix during auger 2 extension or retraction to prevent premature failure of the bushings.

The three auger guide rods 4C-E are arranged in a triangular configuration around the central auger slide shaft 4A and tube 4B to provide strength and rigidity over a two auger guide rod arrangement. The auger guide rods 4C-E are 20 mm in diameter.

Figure 1:
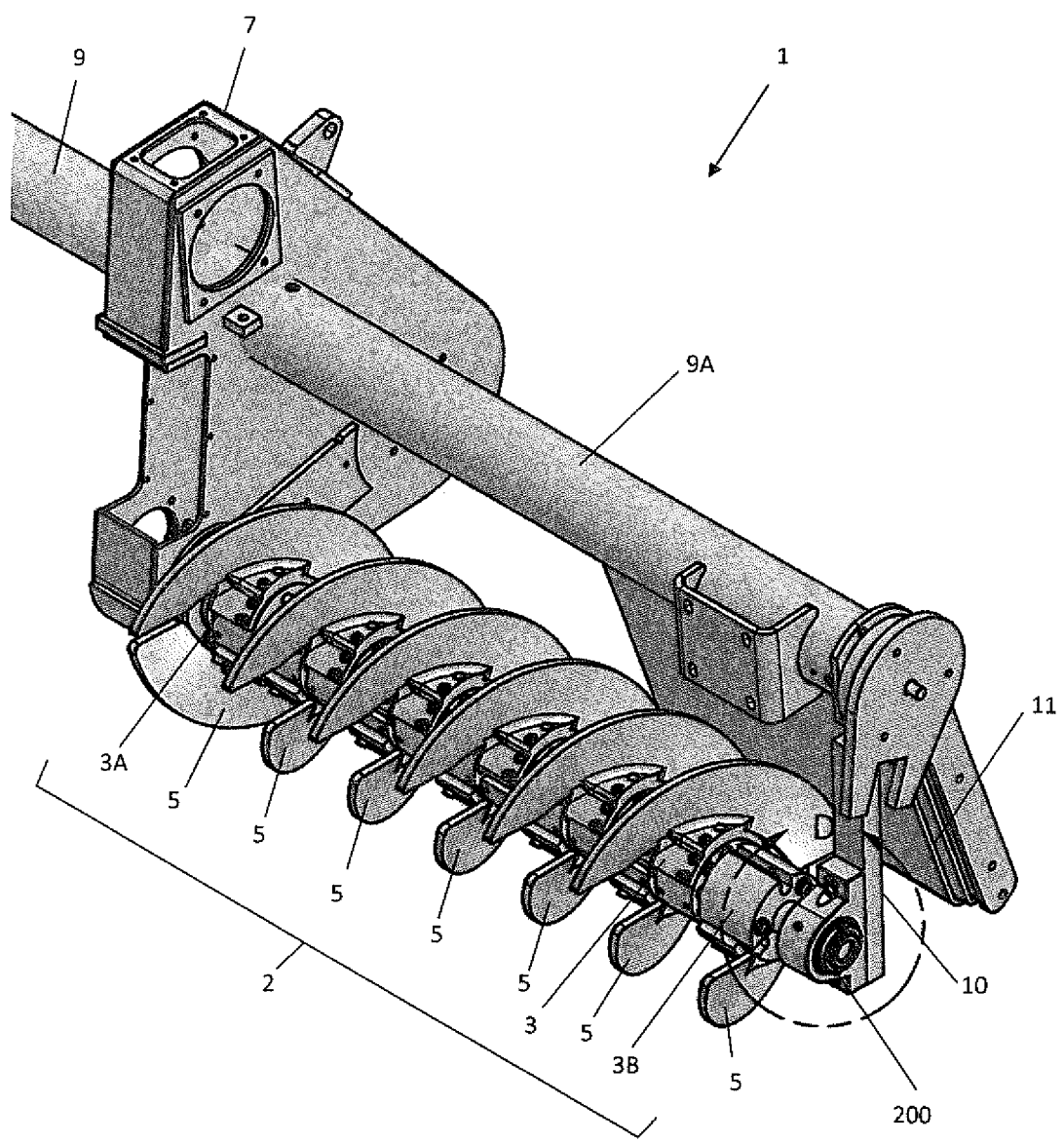
FIG. 1 shows a side perspective view of a preferred embodiment of the present invention in the form of a variable width material distribution apparatus in a retracted position.
Figure 2:
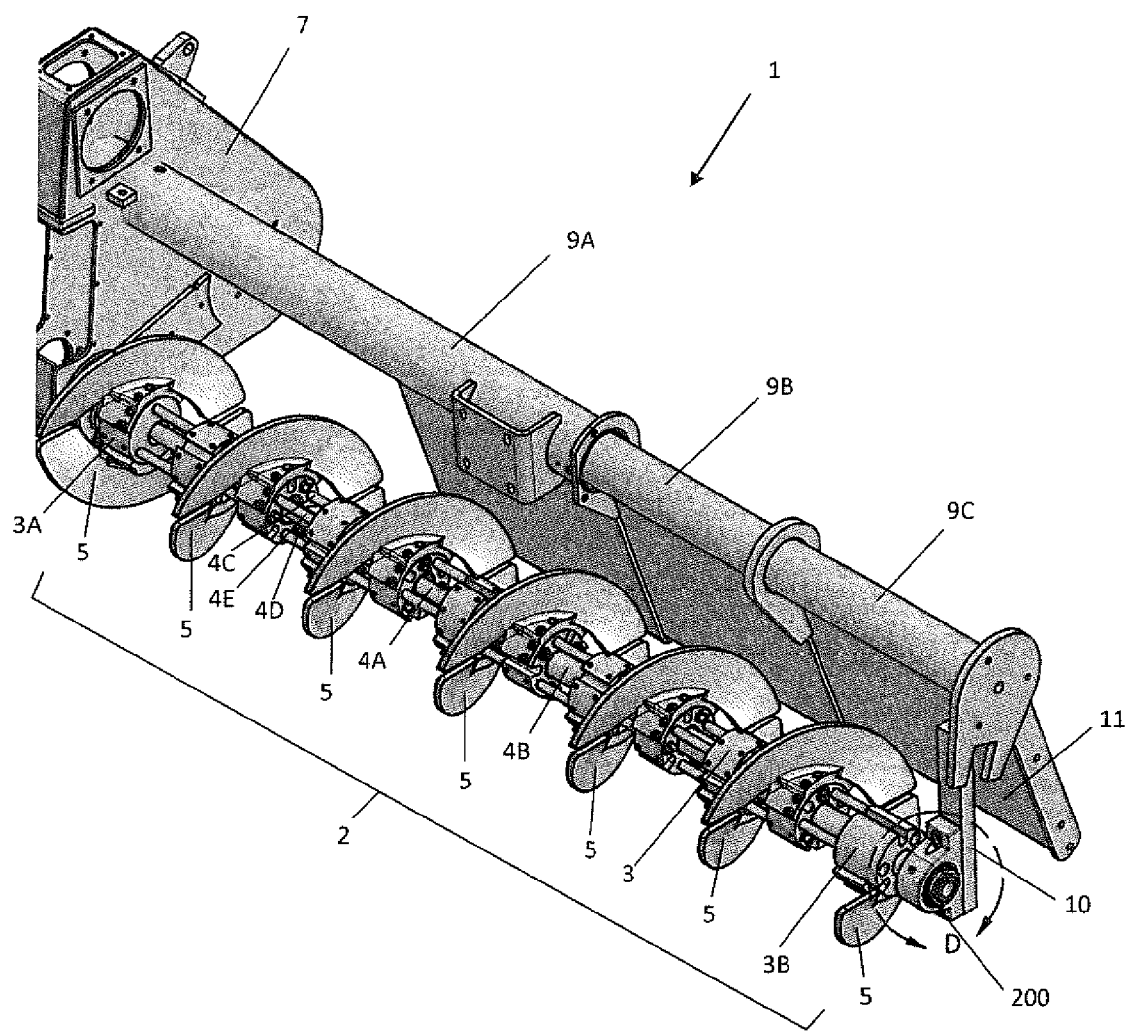
FIG. 2 shows a side view of the preferred embodiment shown in FIG. 1 in an extended position.

An inboard auger slide section 3A is attached at an inboard end of an inner auger drive shaft 6 at inner bearings 100. The inner drive shaft 6 is in turn connected to a motor housed within a central drive box 7 which causes rotation (in the clockwise direction shown by arrow D in FIGS. 1 and 2) and torque to be transmitted to the inner auger drive shaft 6. Torque and rotation of the central auger slide shaft 4A and tube 4B is transmitted to the auger slide sections 3 via the auger guide rods 4C, 4D and 4E. In an alternative arrangement the central drive box 7 is located at an outboard position. With respect to the outboard auger slide section 3B to prevent "centre line segregation" resulting from a centrally located drive box.

Positioned parallel to the auger slide sections 3 is a series of auger support members 9, each auger support member 9 positioned coaxially with each other and configured to telescopically slide with an adjacent auger support member 9 to form a combined auger support of variable length. Best shown in FIGS. 2 and 4, the auger support members 9 consist of an inboard support member 9A, an intermediate auger support member 9B and an outboard auger support member 9C. The intermediate auger support member 9B is configured to extend telescopically from the inboard auger support member 9A and the outboard auger support member 9C is configured to extend telescopically from the intermediate auger support member 9B. The auger support members 9 are extendable and retractable using actuators in the form of a hydraulic ram (not shown) within the inboard auger support member 9A. The hydraulic ram is controlled by a controller box (not shown) configured to provide "on the fly" variation in the length of the auger support members 9 and therefore the auger slide sections 3 via slide linkages.

The outboard auger slide section 3B is coupled at the outboard auger support member 9C at an outboard end via a hanger 10 to provide support for the outboard end of the auger slide sections 3 in relation to the sleeve members 9. Outer bearings 200 enable rotation and torque to be transmitted along the central slide shaft 4A and tube 4B and therefore enable rotation of the auger slide sections 3 in unison in extended or retracted positions in concert with the inner bearings 100. The inner 100 and outer 200 bearings are spherical steel ball bearings in the form of Sealmaster bearings to improve durability. A person skilled in the art will appreciate that other bearings could be used such as tapered roller bearings without departing from the scope of the present invention.

A series of auger guards 11 allow confinement of the head of material during lateral distribution by the auger slide sections 3. The auger guards 11 are attached to the auger support members 9A, 9B and 9C and are configured to extend or retract during corresponding extension or retraction of the auger support members 9B and 9C.

Each component of the auger slide section 3 is replaceable to improve maintenance and serviceability of the distribution apparatus 1. In addition, the auger guide rods 4C, 4D and 4E are replaceable to improve serviceability of the high wear surfaces. The use of press fit studs and bolting enables easy replacement of these components with a hydraulic press and impact gun and sockets.

Figure 3:
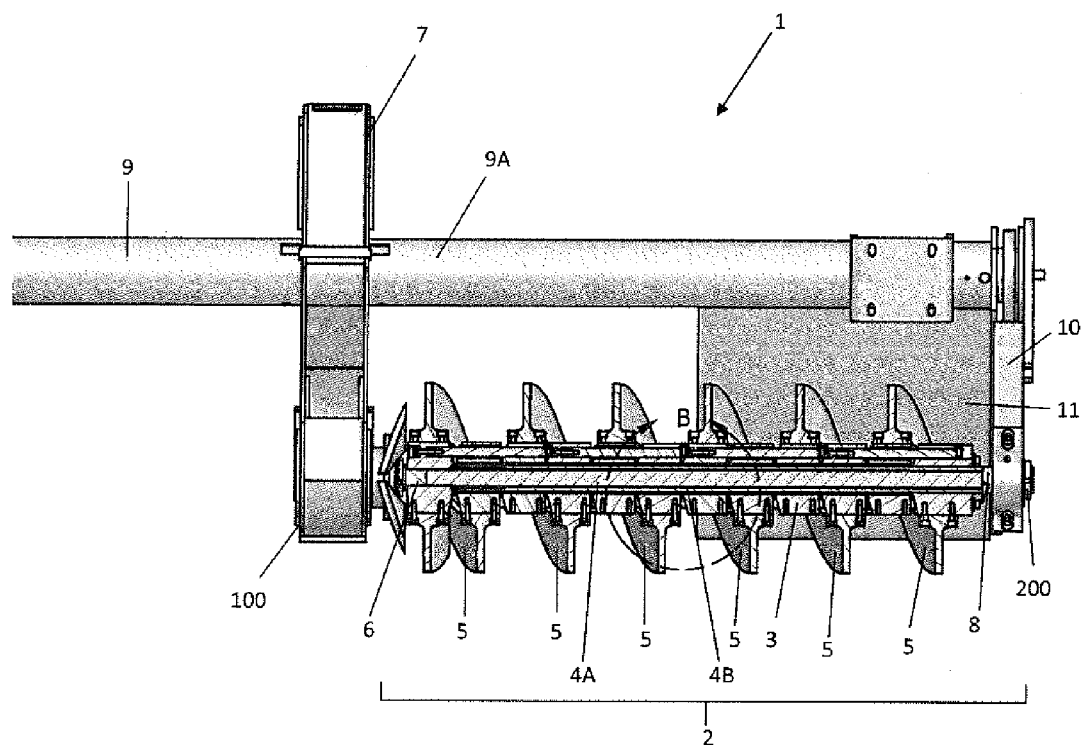
FIG. 3 shows a sectional view of the preferred embodiment shown in FIG. 1 in the retracted position.
Figure 6:
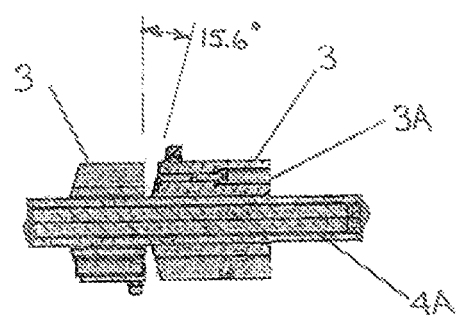
FIG. 6 shows a close-up view of the contact area between adjacent auger slide sections that is tapered at a 15.6° angle and designated area B in FIGS. 3 and 4.

Each auger slide section 3 is configured to self-clean on movement of the auger slide sections 3 between the extended and retracted positions. The slide section 3 comprise solid bushes to prevent hot asphalt mix aggregating and jamming in the grooves 3A of the auger slide linkages 4A during movement of the auger 2 from an extended position to a retracted position. The contact area between adjacent auger slide sections 3 is tapered at a 15.6° angle (shown as area B on FIGS. 3 and 4, and in FIG. 6) that aids in pushing hot asphalt mix away from the auger slide sections 3 that has aggregated between the auger slide sections 3 when the auger 2 is retracted from an extended position.

In addition, the use of chrome on the exposed components of the auger slide section 3 (such as central auger slide shaft 4A and tube 4B and auger guide rods 4C-E) reduces the frequency of sticking of the asphalt mix as it cools and solidifies and therefore jamming of the slide section 3.

In use, extension or retraction of the auger support members 9 causes a corresponding extension or retraction of the auger slide sections 3 (and auger guards 11) along a path of least resistance during passing of the paving machine over a surface to be paved. In practice only 100 mm of auger slide section is moved at any one time to reduce the force on the bushings (not shown) in the auger slide sections 3 and the central auger slide tubes 4B. The auger slide sections 3 are configured to maintain a continuous worm when the auger is in a fully extended position. When the half flight auger slide sections 3a are in the retracted position a double flight auger 1 is achieved.

Actuation of the position of the hydraulic ram (not shown) within the inner auger support member 9A causes either the intermediate 9B or the outer auger support member 9C to telescopically extend with respect to one another and pull the auger slide sections 3 out along a path of least resistance. Each auger flight section 3 is pulled along the corresponding auger slide section 4A and auger guide rods 4B, 4C and 4D until they reach a stop (not shown) in a groove 4D of the particular auger flight section 3, which then begins pulling another auger slide section 3 out until the auger 2 is fully extended. Retraction of the auger 2 is the reversal of this process. When the auger slide sections 3 are fully extended a single flight auger is achieved. Each auger slide section 3 can extend between 95 mm and 102 mm to provide a total auger extension of between 816 mm and 1045 mm.

The auger flighting 5 of each auger slide section 3 is shaped to push the head of screed material rather than throw the material when the auger 2 is in an extended or retracted position. This enables a more consistent pressure on the screed and the volume of screed material so that it can be more easily controlled and directed ahead of the auger 2 which results in an improved quality to the paved surface.

It will be appreciated by those skilled in the art that the material distribution apparatus may take different forms without departing from the scope of the present invention. For example, the number of auger slide sections 3 may be varied in number but is typically in the range of from four and ten.

This, preferred embodiments of the present invention provides a number of advantages over the prior art including:

Improved efficiency of paving a variable width road surface by providing improved consistency in the head of paving material across the entire length of the screed at all times "on-the-go" resulting in a superior quality of paved surface;

Improved quality in paving to a variable width road surface by providing variation in the width of the material distribution apparatus at all times "on-the-go" without compromising the head of paving material;

Improved robustness and reliability during use as a result of a self-cleaning effect of the flight assemblies during extension and retraction; and Improved serviceability, and decreased operating costs, due to all wear components being individually replaceable.

Aspects of the present invention have been described by way of example only and it should be appreciated that modifications and additions may be made thereto without departing from the scope thereof as defined in the appended claims.

The invention claimed is:

1. A variable width material distribution apparatus for use with a paving machine, comprising:
   at least two auger support members including an outboard auger support member, each of said auger support members configured to telescopically engage an adjacent auger support member to form an auger support of variable length;
   at least two auger slide sections including an outboard auger slide section coupled to said outboard auger support member, each of said auger slide sections configured to engage an adjacent auger slide section to form an auger of variable length;
   an actuator for moving said outboard auger support member and said outboard auger slide section between a retracted position and an extended position; and
   a sliding linkage supporting said at least two auger slide sections, said sliding linkage including a series of auger guide rods configured around a central auger slide shaft and a tube having internal bushings to enable movement of said central auger slide shaft within said tube, said sliding linkage connected to a drive shaft for rotating said at least two auger slide sections.

2. The variable width material distribution apparatus of claim 1, wherein each of said auger slide sections includes a half auger flighting and is configured to maintain a substantially continuous worm with respect to an adjacent auger slide section in any position between the retracted position and the extended position.

3. The variable width material distribution apparatus of claim 1, wherein said series of auger guide rods includes a group of three auger guide rods associated with each of said at least two auger slide sections.

4. The variable width material distribution apparatus of claim 3, wherein each group of three auger guide rods is arranged in a triangular configuration around said central auger slide shaft and said tube.

5. The variable width material distribution apparatus of claim 4, wherein at least one of said auger slide sections includes grooves for receiving said three auger guide rods associated with an adjacent auger slide section in the retracted position.

6. The variable width material distribution apparatus of claim 1, wherein said at least two auger slide sections includes between 3 and 10 auger slide sections.

7. The variable width material distribution apparatus of claim 1, wherein each auger slide section includes at least one tapered surface which is configured to remove asphalt mix which as stuck between adjacent auger slide sections.

8. The variable width material distribution apparatus of claim 7 wherein said at least one tapered surface is positioned at an angle of 15.6° and is configured to push asphalt mix positioned between adjacent auger slide sections away from same.

9. A variable width material distribution apparatus for use with a paving machine, comprising:
   inboard, intermediate, and outboard auger support members configured to telescopically engage adjacent auger support members to form an auger support of variable length;
   at least inboard and outboard auger slide sections configured to form an auger of variable length;
   an actuator for moving said outboard auger support member between a retracted position and an extended position; and
   a sliding linkage supporting said at least inboard and outboard auger slide sections, said sliding linkage connected to a drive shaft for rotating said at least inboard and outboard auger slide sections,
   wherein said at least inboard and outboard auger slide sections each include a plurality of auger guide rods configured around a central auger slide shaft and a tube having internal bushings to enable movement of said central auger slide shaft within said tube.

10. The variable width material distribution apparatus of claim 9, wherein each of said at least inboard and outboard auger slide sections includes a half auger flighting and is configured to maintain a substantially continuous worm with respect to an adjacent auger slide section in any position between the retracted position and the extended position.

11. The variable width material distribution apparatus of claim 9, wherein said plurality of auger guide rods is arranged in a triangular configuration around said central auger slide shaft and said tube.

12. The variable width material distribution apparatus of claim 11, wherein at least one of said at least inboard and outboard auger slide sections includes grooves for receiving said plurality of auger guide rods in the retracted position.

13. The variable width material distribution apparatus of claim 9, wherein at least one of said at least inboard and outboard auger slide sections includes at least one tapered surface which is configured to remove asphalt mix which is stuck between adjacent auger slide sections.

14. The variable width material distribution apparatus of claim 9, wherein an inboard side of said inboard auger slide section is connected to a body of the material distribution apparatus at a first bearing configured to provide for rotation of said at least inboard and outboard auger slide sections in unison in any position between the retracted position and the extended position.

15. The variable width material distribution apparatus of claim 9, wherein an outboard side of said outboard auger slide section is connected to a hanger at a second bearing configured to provide for rotation of said at least inboard an outboard auger slide sections in unison in any position between the retracted position and the extended position.

16. A variable width material distribution apparatus for use with a paving machine, comprising:

at least two auger support members including an outboard auger support member, each of said auger support members configured to telescopically engage an adjacent auger support member to form an auger support of variable length;

at least three auger slide sections including an outboard auger slide section coupled to said outboard auger support member, each of said auger slide sections configured to engage an adjacent auger slide section to form an auger of variable length;

an actuator for moving said outboard auger support member and said outboard auger slide section between a retracted position and an extended position;

a sliding linkage supporting said at least three auger slide sections, said sliding linkage including a series of auger guide rods configured around a central auger slide shaft, said sliding linkage connected to a drive shaft for rotating said at least three auger slide sections; and a drive box including a motor configured to provide rotation to said drive shaft.

17. The variable width material distribution apparatus of claim 16, wherein said sliding linkage further includes a tube having internal bushings to enable movement of said central auger slide shaft within said tube.

18. The variable width material distribution apparatus of claim 17, wherein said series of auger guide rods includes a group of three auger guide rods associated with each of said at least three auger slide sections.

19. The variable width material distribution apparatus of claim 18 wherein said series of auger guide rods is arranged in a substantially triangular configuration around said central auger slide shaft and said tube.

20. The variable width material distribution apparatus of claim 16, wherein at least two of said at least three auger slide sections includes grooves for receiving said group of three auger guide rods in the retracted position.

\* \* \* \* \*